United States Patent [19]
Holley et al.

[11] Patent Number: 5,678,709
[45] Date of Patent: *Oct. 21, 1997

[54] SUBSTANCE CONTAINMENT APPARATUS AND METHOD

[75] Inventors: James W. Holley, Maple Valley; Kirk B. Kajita, Seattle, both of Wash.

[73] Assignee: Insta-Mix Partners, Newcastle, Wash.

[*] Notice: The term of this patent shall not extend beyond the expiration date of Pat. No. 5,275,298.

[21] Appl. No.: 671,032

[22] Filed: Jun. 26, 1996

Related U.S. Application Data

[63] Continuation of Ser. No. 244,619, Jun. 2, 1994, Pat. No. 5,540,341, which is a continuation-in-part of Ser. No. 804,883, Dec. 6, 1991, abandoned.

[51] Int. Cl.⁶ .................................................. A61J 9/00
[52] U.S. Cl. ..................... 215/11.4; 215/11.1; 215/11.5; 220/253; 222/554
[58] Field of Search ........................... 220/714, 715, 220/717, 253, 502; 215/6, 11.1, 11.4, 43, 44, 45, 235, 307, 311, 313; 222/554

[56] References Cited

U.S. PATENT DOCUMENTS

| | | |
|---|---|---|
| 1,333,051 | 3/1920 | Young . |
| 1,691,811 | 11/1928 | Johnson . |
| 1,701,433 | 2/1929 | Witt . |
| 1,747,550 | 2/1930 | Klimburg . |
| 2,133,411 | 10/1938 | Zohe . |
| 2,197,672 | 4/1940 | Winters . |
| 2,448,569 | 9/1948 | Allen . |
| 2,629,508 | 2/1953 | Prager . |
| 2,793,776 | 5/1957 | Lipari . |
| 2,807,384 | 9/1957 | Lipari . |
| 2,813,649 | 11/1957 | Lipari . |
| 2,885,104 | 5/1959 | Greenspan . |
| 2,931,731 | 4/1960 | Pohjola . |
| 3,198,477 | 8/1965 | Allenbaugh, Jr. . |
| 3,521,745 | 7/1970 | Schwartzman ............... 220/502 X |
| 3,762,540 | 10/1973 | Baumann et al. . |
| 3,924,741 | 12/1975 | Kachur et al. ............... 215/6 X |
| 4,175,658 | 11/1979 | Moser et al. . |
| 4,823,946 | 4/1989 | Stoeffler et al. ............ 215/6 X |
| 4,863,454 | 9/1989 | LaBove . |
| 5,275,298 | 1/1994 | Holley, Jr. et al. ........... 215/11.1 X |
| 5,419,445 | 5/1995 | Kaesemeyer ............... 215/11.1 |

FOREIGN PATENT DOCUMENTS

| | | |
|---|---|---|
| C-1781 | 11/1877 | Germany . |
| 2124361 | 11/1972 | Germany ............... 220/253 |

*Primary Examiner*—Jes F. Pascua
*Attorney, Agent, or Firm*—Skjerven, Morrill, MacPherson, Franklin & Friel, LLP; Patrick T. Bever

[57] ABSTRACT

A multi-chamber substance containment apparatus including a bottle, a spherical hollow member and a housing. The bottle includes an opening surrounded by a flange which has a spherical inner surface formed to receive the hollow member. The hollow member includes a lower opening and an upper opening. The housing is adjustably connected to the bottle to bias the hollow member against the spherical inner surface of the flange, thereby creating a seal around the opening of the bottle. In a closed position, a portion of the hollow member blocks the opening of the bottle. In an open position, the hollow member is rotated into an upright position such that the opening of the bottle and the lower opening of the hollow member are aligned to form a passage between an interior of the bottle and an interior of the hollow member. A method for storing and mixing a liquid and a substance using the apparatus includes disposing an amount of liquid in the bottle, adjusting the hollow member to block the opening of the bottle, and disposing an amount of substance in the hollow member. At a desired time, the hollow member is rotated into the open position and the apparatus is shaken to mix the liquid and the substance.

21 Claims, 6 Drawing Sheets

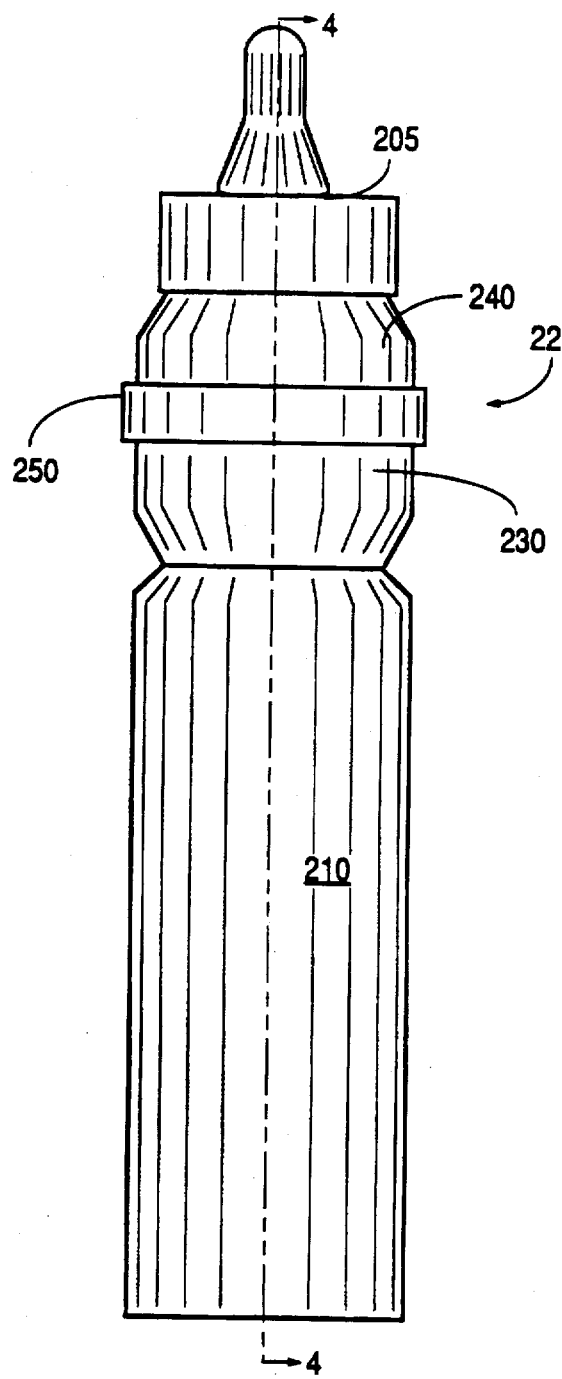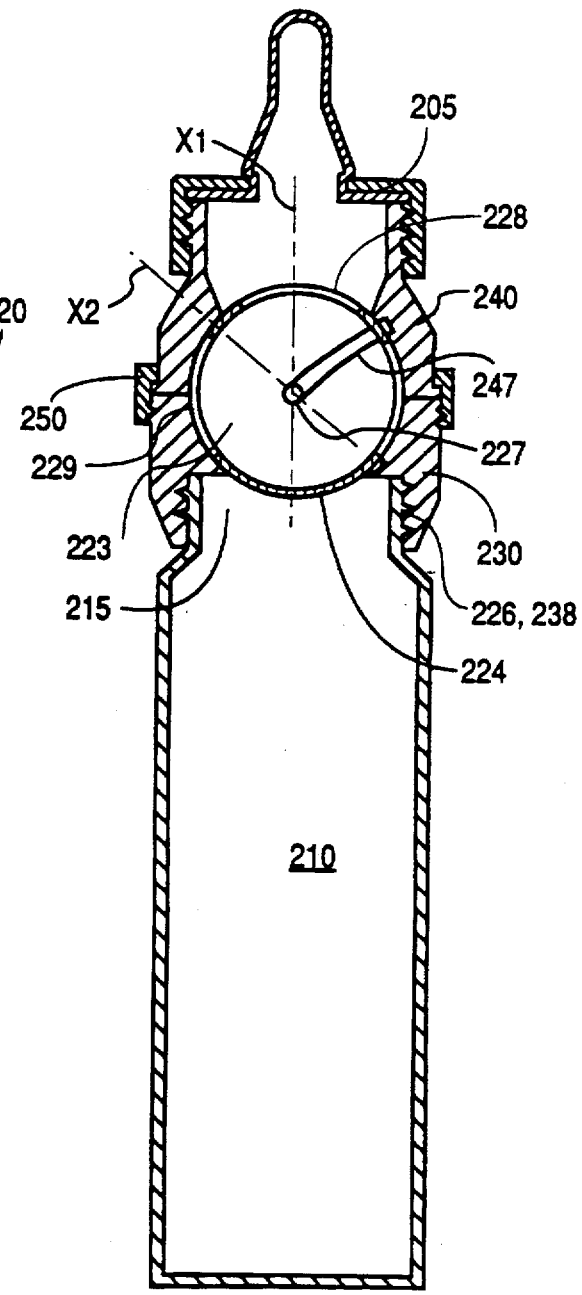
Fig. 3
Fig. 4

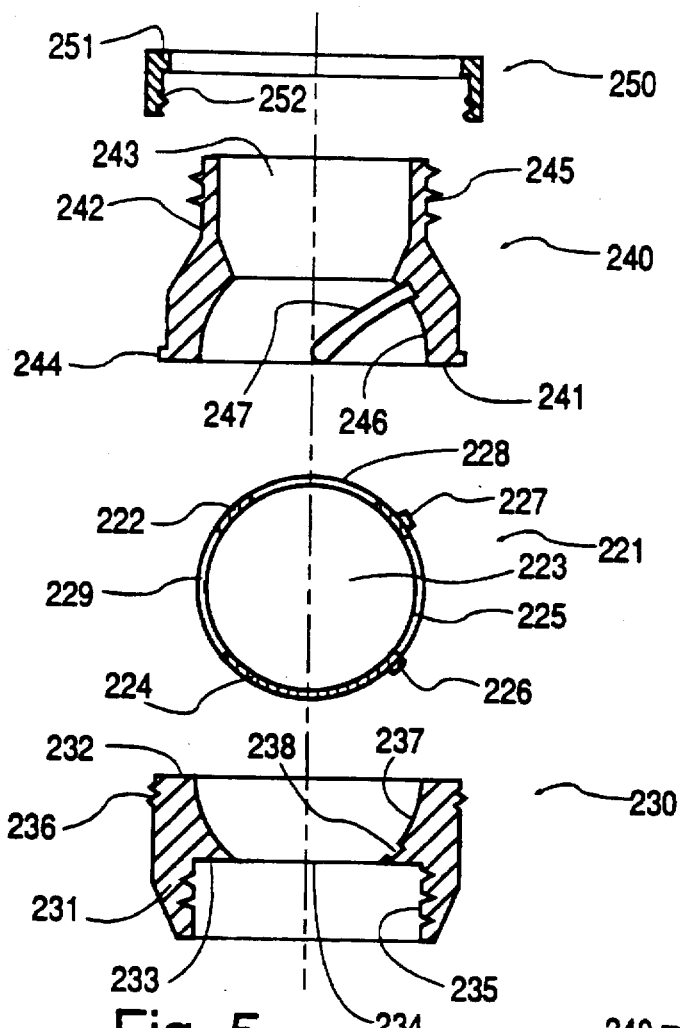
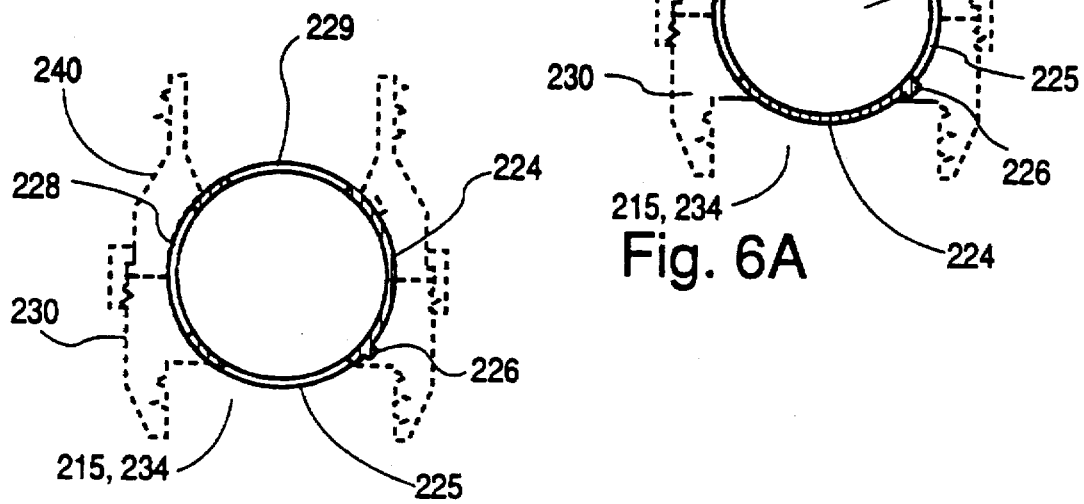
Fig. 5
Fig. 6A
Fig. 6B

SUBSTANCE CONTAINMENT APPARATUS AND METHOD

This application is a continuation of application Ser. No. 08/244,619, filed Jun. 2, 1994, which is a national application claiming priority of PCT Application No. US92/10333, which is a continuation-in-part of application Ser. No. 07/804,883 filed Dec. 6, 1991 now abandoned.

BACKGROUND

1. Field of the Invention

The present invention relates to a multi-chamber substance containment apparatus for separately storing two or more substances in one container.

2. Description of the Prior Art

Dehydration is a common method of preserving perishable foods. For example, the usable periods ("shelf-life") of liquid milk is increased from a few weeks to several months or more by dehydrating the liquid milk to form powdered milk. Dehydrated substances are particularly useful when refrigeration is not available because the dehydrated substances can be stored at room temperature. Of course, when dehydrated edible substances are re-hydrated by mixing with a liquid, the shelf-life of the re-hydrated edible substance is typically the same as or shorter than the perishable food from which the dehydrated substance was produced. Therefore, it is advantageous to postpone the hydration process until the dehydrated substance and liquid are mixed; that is, immediately prior to consumption.

FIG. 1 shows a prior art baby bottle 10 used to dispense liquid baby formula or milk. The baby bottle 10 includes an outer wall 11 defining a chamber 12, a mouth 13 defining an opening 14, and a nipple assembly 15 which covers the opening 14. The nipple assembly 15 includes a base 16 and a nipple 17. The nipple assembly 15 is typically connected to the bottle portion 10 by means of mating threads 8 and 18 which are located on the mouth 13 and the base 16, respectively.

Powdered baby formula and water are mixed in the prior art baby bottle 10 by inserting predetermined amounts of powdered formula and water through the opening 14 into the chamber 12, attaching the nipple portion 15, and shaking the baby bottle 10 until the powdered formula and water mix to produce liquid baby formula. The liquid baby formula is then either immediately consumed or refrigerated for later consumption.

There are several disadvantages associated with the use of prior art single-chamber containers, such as the above-described baby bottle, for preparing hydrated mixtures from a dehydrated substance. One disadvantage is that two storage containers are required to store the water and the dehydrated substance prior to mixing. Mixing requires transferring one of the dehydrated substance and the water from one container to the other. The dehydrated substance and the water can be contaminated during the transfer, particularly when mixing is performed away from home. In addition, in some situations, such as when mixing is performed in a car, spillage or incorrect mixing quantities can result because level surfaces and suitable measuring devices are not available.

Prior art containment apparatuses addressing the above-described disadvantages are taught in U.S. Pat. Nos. 2,793,776, 2,807,384 and 2,813,649 (the "Lipari patents"). Each apparatus taught in the Lipari patents includes first and second chambers joined by a narrow channel which is blocked by an axially-displaced seal or a seal punctured by an axially-displaced plunger.

A problem with the apparatuses taught in the Lipari patents is that the narrow channel between the first and second chambers is too small to allow thorough mixing of the liquid and substance.

Another problem is that the axially-displaced seals and plunger impede mixing through the narrow channel after the seals are opened. That is, the liquid is impeded from entering the chamber containing the substance because the axially-displaced seals and plunger block a portion of the effective "flow area" between the two chambers.

Another problem with the apparatuses taught in the Lipari patents is that they are comprised of numerous parts and mechanisms. Therefore, the apparatuses are complicated to use and expensive to produce.

SUMMARY

The present invention is directed to an apparatus that satisfies the need for a multi-chamber container which allows thorough mixing of two substances. The apparatus comprises a bottle having a first opening, and a hollow member which includes a curved wall and a second opening. The hollow member is adjustable between a closed position, in which the curved wall is disposed to block the first opening, and an open position in which the first and second openings align to define a passage between an interior of the bottle and an interior of the hollow member.

The apparatus provides a sanitary method for storing and mixing two substances, such as water and powdered baby formula, which overcomes the problems associated with prior art multi-chamber apparatus. The rotating or pivoting action of the curved wall between the open and closed positions provides a large, unobstructed flow area. In addition, the rotating or pivoting action allows for a less complicated and less expensive design.

In a first embodiment the apparatus includes a bottle and a hollow member, the hollow member being comprised of a housing connected to the bottle and a ball member rotatably disposed in the housing. The ball member includes the second opening. A portion of the ball member blocks the first opening of the bottle when the ball member is in a closed position, and the second opening aligns with the first opening to form a passage between the interior of the bottle and an interior of the ball member when the ball member is in an open position.

In a presently preferred embodiment, the hollow member is a sphere defining an upper opening and a lower opening, and the apparatus further comprises a housing adjustably connected to the bottle. The housing includes an interior portion wherein the hollow member is rotatably disposed when the housing is loosely connected to the bottle. When the housing is tightly connected to the bottle, the hollow member is fixedly held in a selected position such as an open position, wherein the lower opening aligns with the first opening of the bottle, or a closed position, wherein a portion of the hollow member blocks the first opening of the bottle. The hollow member can be fixedly held such that the lower opening only partially aligns with the first opening in the bottle to provide a slower mixing of the substances stored in the hollow member and the bottle.

In accordance with the present invention, a method of containing a substance and a liquid for mixing at a predetermined time comprises the steps of disposing a first predetermined amount of the liquid in a bottle having a first opening, rotating a curved wall to block the first opening, storing a second predetermined amount of a substance in a hollow member having a second opening, and at the predetermined time, rotating the curved wall away from the opening such that a passage is created between the liquid and the substance.

BRIEF DESCRIPTION OF THE DRAWINGS

The display device of the present invention as described in detail below will be best understood by reference to the drawings in which:

FIGS. 2A to 2F show side section views of substance containment apparatus incorporating the present invention.

FIG. 3 shows a front view of a first embodiment of the present invention.

FIG. 4 shows a section side view of the first embodiment taken along line 4—4 of FIG. 3.

FIG. 5 shows an exploded section view of the hollow member of the first embodiment.

FIGS. 6A and 6B show partial side section views showing the open and closed positions of the hollow member in accordance with the first embodiment.

DESCRIPTION

Figure 1:
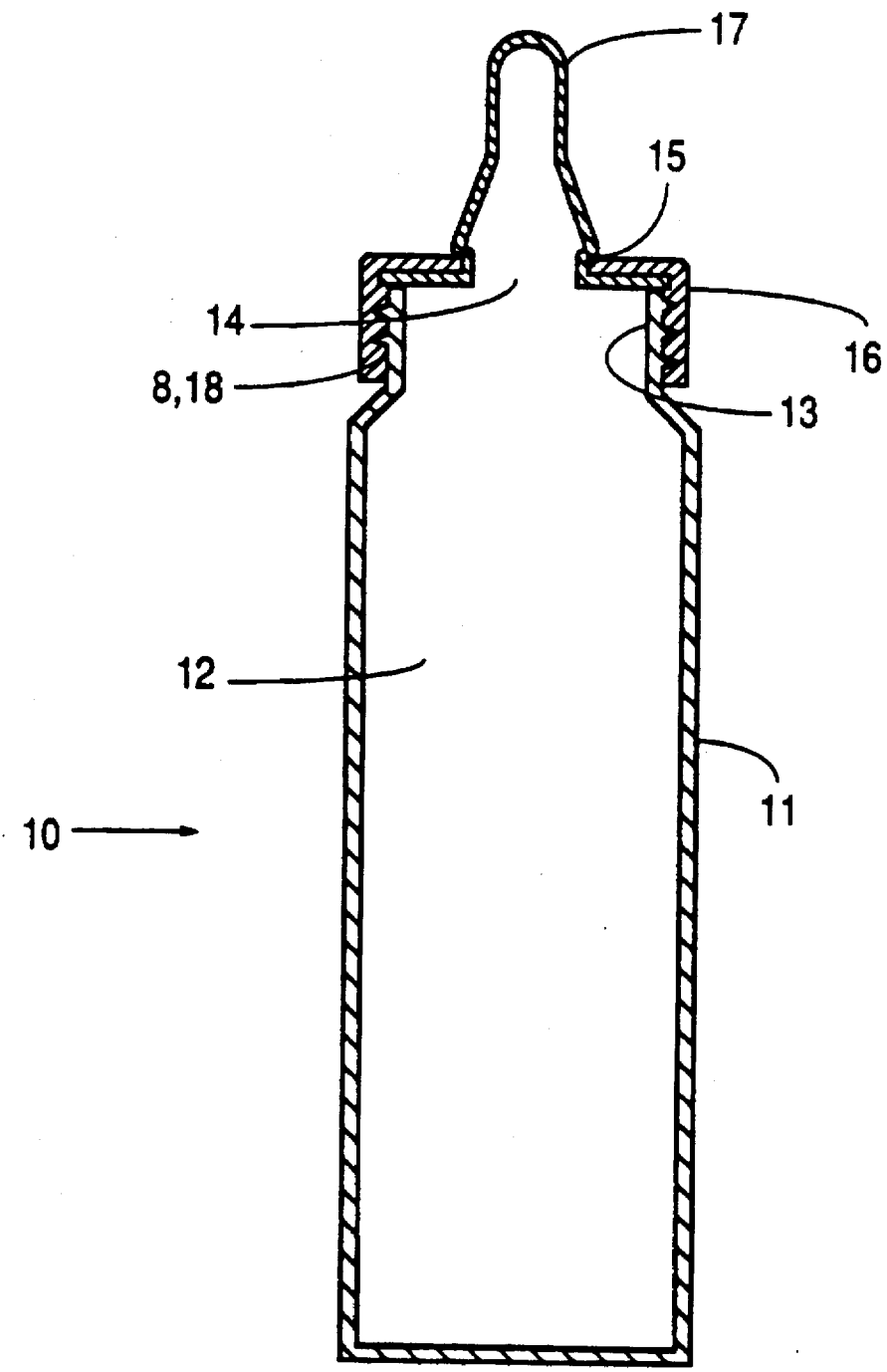
FIG. 1 shows a section view of a prior art baby bottle.
Figure 2A:
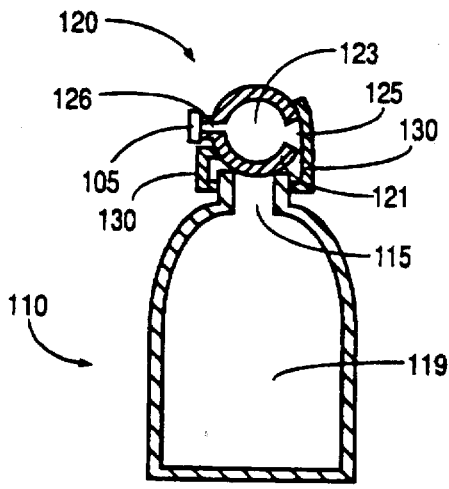
Figure 2B:
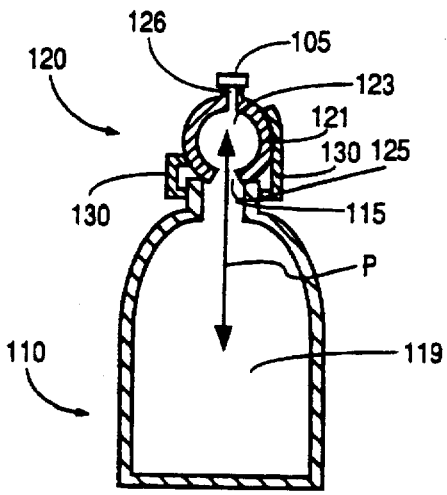

As shown in FIGS. 2A to 2D, a substance containment apparatus incorporating the present invention includes a bottle 110 having a first opening 115 and a hollow member 120 adjustably disposed adjacent the bottle 110. A connector 130 connects the hollow member 120 to the bottle 110. The hollow member 120 includes a curved wall 121, a second opening 125 and a third opening 126. A cover 105 is disposed over the third opening 126. The hollow member 120 is adjustable relative to the bottle 110 such that when the hollow member 120 is in a closed (first) position, as shown in FIG. 2A, a portion 122 of the curved wall 121 is disposed to block the first opening 115 of the bottle 110, and when the hollow member 120 is in an open (second) position, as shown in FIG. 2B, the first opening 115 and the second opening 125 align to define a passage (indicated by arrow P) between an interior 119 of the bottle 110 and an interior 123 of the hollow member 120. The connector 130 fixedly connects the hollow member 120 to the bottle 110 in the open position, the closed position, or an intermediate position (not shown). The hollow member 120 can be fixedly held such that the second opening 125 only partially aligns with the first opening 115 in the bottle to provide a slower mixing of the substances stored in the hollow member 120 and the bottle 115.

As shown in FIGS. 2A and 2B, in one embodiment of the present invention, the hollow member 120 is integrally formed with the curved wall 121. In this embodiment, the second opening 125 is formed in the curved wall 121, and the curved wall 121 pivots or rotates relative to the bottle 110 from the open position to the closed position. The curved wall 121 can either be a planar curved surface, a spherical surface, or a surface combining planar and spherical portions. The remaining portions of hollow member 120 can be any other shape, so long as adjustment from the open position to the closed position is not impeded.

Figure 2C:
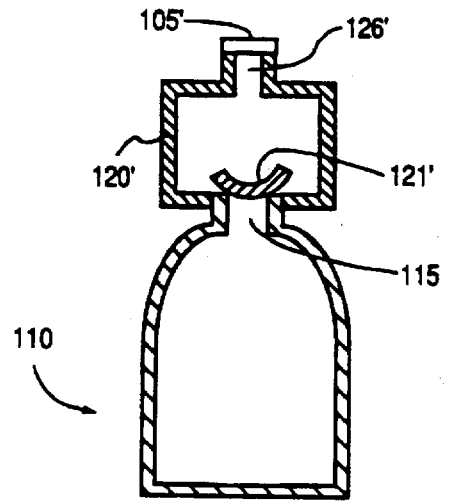
Figure 2D:
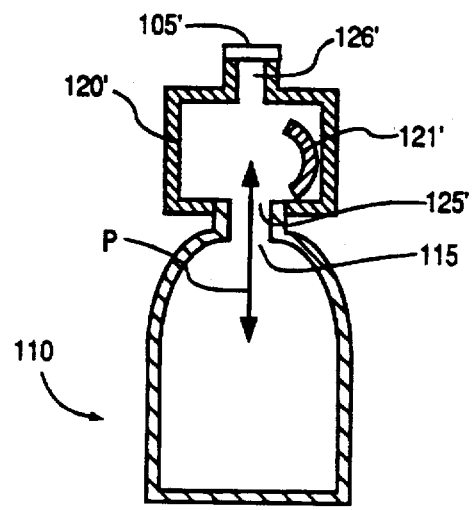

As shown in FIGS. 2C and 2D, in another embodiment of the present invention, hollow member 120' and curved wall 121' are formed as separate elements. Hollow member 120' is a housing having second opening 125' and third opening 126'. A removable cover 105' is disposed over third opening 126'. Curved wall 121' is shown as a partial cylinder or sphere which is rotatably or pivotably disposed in the hollow member 120'; however, the curved wall 121' can also be a full cylinder or sphere.

Figure 2E:
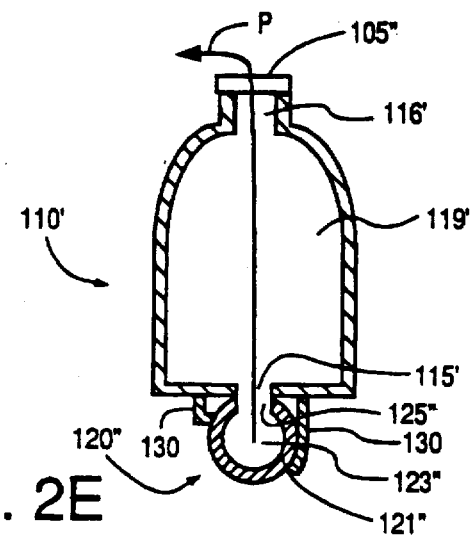

As shown in FIG. 2E, in another embodiment, bottle 110' includes an upper opening 116' covered by removable cover 105" and a lower opening 115'. A hollow member 120" is adjustably disposed adjacent the lower opening 115'. In this embodiment the substances stored in the hollow member 120" and in the bottle 110' can pass through the upper opening 116' after the hollow member 120" is in the open position and the cover 105" is removed.

A method of containing and mixing a substance and a liquid using the substance storage apparatuses described above includes the steps of disposing a first predetermined amount of the liquid in the bottle 110, adjusting the curved wall 121 to block the opening 115, and storing a second predetermined amount of a substance in the hollow member 120. At a desired mixing time, the hollow member 120 is adjusted such that the curved wall 121 no longer blocks the opening 115, thereby allowing the liquid in the bottle 110 to mix with the substance stored in the hollow member 120. The substance storage apparatus is then manually or mechanically shaken to thoroughly mix the substance and the liquid.

A benefit of the present invention over the containment systems of the prior art is that the curved wall 121 can be rotated away from the opening 115 of the bottle 110, thereby allowing a large, unobstructed passage through which the substances stored in the bottle 110 and the hollow member 120 can be mixed. Further, the hollow member 120 incorporating the present invention is inexpensive to manufacture, and simple to use.

Other aspects and benefits of the present invention will become apparent in the following descriptions of two embodiments of the present invention.

First Embodiment

FIGS. 3 to 6B illustrate a first embodiment of a substance containment apparatus incorporating the present invention.

As shown in FIGS. 3 and 4, the apparatus comprises a bottle 210 and a hollow member 220 comprised of a lower casing 230 connected to the bottle 210, an upper casing 240 disposed on the lower casing 230, means 250 for connecting the lower casing 230 to the upper casing 240, and a ball member 221 rotatably disposed within a hollow portion defined by the upper casing 240 and the lower casing 230. A cover or nipple assembly 205 is optionally connected to the upper casing 240. All parts of the housing are preferably made of plastic and are produced using known molding methods.

As shown in FIG. 5, the lower casing 230 includes a lower portion 231, and an upper portion 232. The lower portion 231 includes a shelf 233 which abuts a mouth of the bottle 210 when the lower casing 230 is connected to bottle 210. The lower portion 231 includes an opening 234 and includes lower threads 235. The lower threads 235 and the shelf 233 are disposed to mate with the bottle 210 such that a passage is formed through the lower opening 234 and the opening 215 of the bottle 210. The upper portion 232 includes upper threads 236 which connect the lower casing 230 to the upper casing 240 using the connector 250, as described below. The lower casing 230 also has a curved inner surface 237 shaped as a semisphere into which is formed a depression or seat 238. The curved inner surface 237 is formed to receive the ball member 221, and the seat 238 is used as a pivot point about which the ball member 221 is rotated, as discussed below. Finally, an O-ring (not shown) is optionally placed between the shelf 233 and the mouth of the bottle 210 to prevent leakage.

The upper casing 240 includes a lower portion 241 which abuts the upper portion 232 of lower casing 230, and a neck 242 defining an opening 243. The lower portion 241 includes a shoulder 244 which is used to connect the upper casing 240 to the lower casing 230 using the connector 250, as described below. Threads 245 are disposed on the outer surface of the neck 242 such that a cover, such as a nipple assembly 205, can be connected to the upper casing 240 to close the opening 243. The upper casing 240 also has a spherical or curved inner surface 246 into which is formed a cam groove 247. The curved inner surface 246 is formed to receive the ball member 221, and the cam groove 246 is used to rotate the ball member 221, as discussed below. Finally, an O-ring (not shown) is optionally disposed between the upper portion 231 of lower casing 230 and the lower portion 241 to prevent leakage.

The connector 250, shown as a locking ring in the present embodiment, includes a lip 251 and threads 252. The lip 251 rests on the shoulder 244 of the upper casing 240 and threads 252 engage the upper threads 236 of lower casing 230. When the connector 250 is rotated, the lip 251 presses down on the shoulder 244, thereby biasing the lower portion 241 against the upper portion 232 of the lower casing 230. Finally, connector 250 is not limited to a locking ring and can be, for example, a fastener or clamp.

The ball member 221 is disposed in a hollow space defined by curved inner surface 237 and curved inner surface 246. The ball member 221 includes a spherical outer wall 222 which is sized such that when the upper casing 240 is biased toward the lower casing 230 by the connector 250, the ball member 221 is fixedly held by opposing forced exerted from the upper casing 240 and lower casing 230. Note that when the ball member 221 is fixedly held in this manner, the ball member 221 presses against the upper casing 240 such that it cannot be rotated relative to the lower casing 230. The ball member 221 defines a hollow interior 223 and the outer wall 222 includes a blocking portion 224 and defines a lower (second) opening 225. When the ball member 221 is in a closed (first) portion, the blocking portion 224 is disposed to block the opening 234 of the lower casing 230 and the opening of the bottle 210. Conversely, when the ball member 221 is in an open (second) rotated position, the lower opening 225 aligns with the opening 234 of lower casing 230 and the opening of bottle 210 to form a passage from the interior of the bottle 210 to the interior 223 of the hollow member 221. Further, a protuberance or pin 226 and a cam follower 227 are formed on the outer wall 222. The pin 226 is pivotally disposed in the seat 238 of the lower casing 230. The pin 226 is used as a pivot around which the ball member 221 is rotated between the open position and the closed position. The cam follower 227 is slidably disposed in the cam groove 247 of the upper casing 240. When the ball member 221 is rotated around the pin 226, the cam follower 227 slides within the cam groove 247. Finally, the outer wall 222 defines first upper opening 228 and second upper opening 229.

The above-described substance containment apparatus operates as follows.

The liquid and the substance are stored in the apparatus using the following steps. First, a predetermined amount of liquid is stored in the bottle 210 and the hollow member 220 is connected to the bottle. With the apparatus assembled as shown in FIG. 4, the connector 250 is then loosened such that the upper casing 240 is pivotable relative to the lower casing 230 and the ball member 221 is rotatable within the upper casing 240 and the lower casing 230. The upper casing 240 is then pivoted around the axis X1 such that the cam follower 227 is forced along the cam groove 247 to rotate the ball member 221 around the axis X2 into the closed position shown in FIG. 6A. In the closed position, the blocking portion 224 is disposed over the opening 234 of the lower casing 230 and the opening 215 of the bottle 210, thereby sealing the liquid from the interior 223 of the ball member 221. The connector 250 is then tightened to fixedly retain the ball member 221 within the upper casing 240 and lower casing 230 in the closed position. The cover or nipple assembly 205 is then removed from the upper casing 240, and a predetermined amount of a substance, such as powdered baby formula, is inserted through the first upper opening 228 into the interior 223 of the ball member 221. The cover or nipple assembly 205 is then connected to the upper casing 240. In this state, the substance and liquid are both stored separately within the apparatus, thereby allowing a long storage period without refrigeration.

At a desired time, mixing of the liquid stored in the bottle 210 and the substance stored in the hollow member 220 is effected by adjusting the hollow member into the open position as follows. First, the connector 250 is loosened to allow rotation of the upper casing 240 about the axis X1. The upper casing 240 is then rotated, thereby exerting a force on the cam follower 227 such that the ball member 221 is rotated about the axis X2 such that the blocking portion 224 is rotated away from the opening 234 of the lower casing 234 and the opening 215 of the bottle 210. With the hollow member 220 in the open position the lower opening 225, the opening 234 of lower casing 230, and the opening 215 of the bottle 210 align to form a passage between the interior of the bottle and the interior 223 of the hollow member, thereby exposing the substance to the liquid. With the ball member 221 in the open position, the connector 250 is retightened and the apparatus is shaken to mix the substance and liquid. The mixture can then be consumed through the nipple assembly 205.

The above-described operation steps can be altered without departing from the spirit or scope of the present invention. For example, the bottle 210 can be stored separately from the hollow member 220 until the desired mixing time. However, this would require that a second cover be provided to retain the liquid in the bottle, and there would be an increased risk of contamination of the mixture because the liquid would be exposed to the surrounding environment when the second cover is removed to connect the bottle 210 to the hollow member 220.

Second (Preferred) Embodiment

Figure 7:
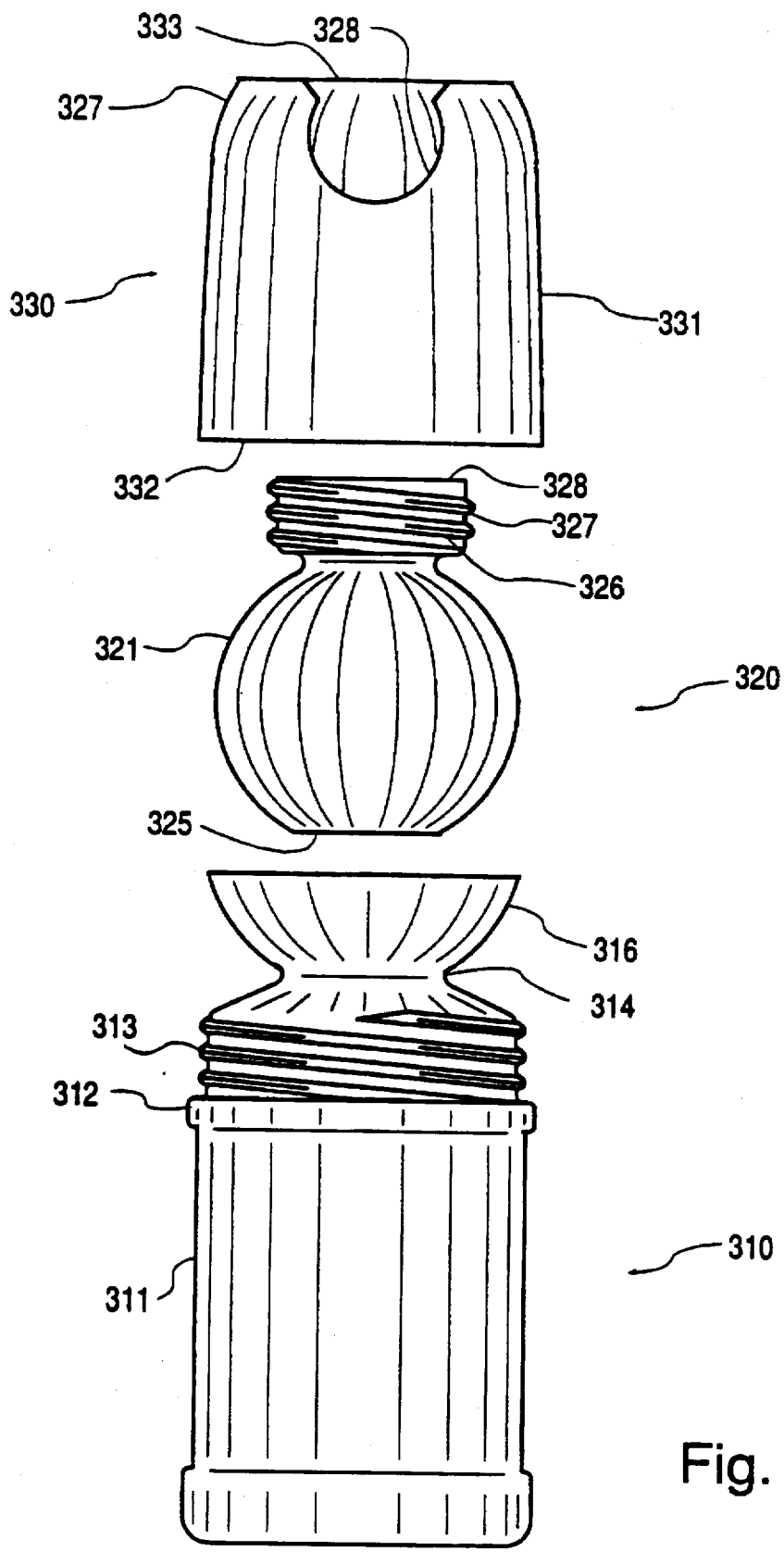
FIG. 7 shows an exploded perspective view of a second embodiment incorporating the present invention.
Figures 8, 9:
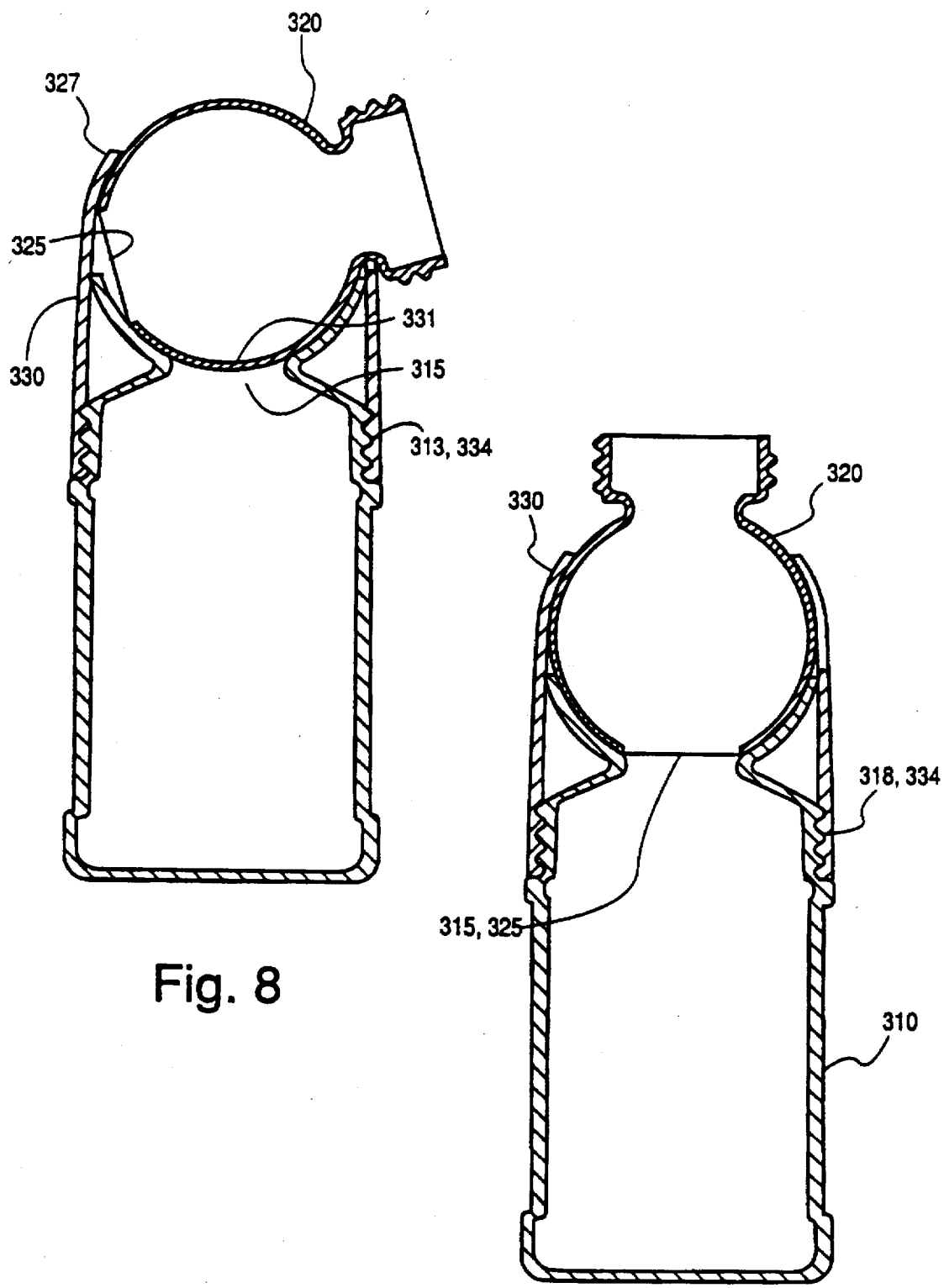
FIG. 8 shows a section side view of the apparatus of FIG. 6 in a closed position.
FIG. 9 shows a section side view of the apparatus of FIG. 6 in an open position.

FIGS. 7 to 9 illustrate a preferred embodiment of a substance containment apparatus incorporating the present invention. In this embodiment, the apparatus comprises a bottle 310, a hollow member 320 and a housing 330. All parts of the housing are preferably made of plastic and are produced using known molding methods. In addition, the sizes of the parts are determined by the amount of the substances to be stored.

The bottle 310 includes a cylindrical body 311, a lip 312, threads 313 formed above the lip 312, a neck 314 defining a (first) opening 315 formed above the threads, and a flange 316 formed above the neck 314. For the production of eight ounces of hydrated mixture, the overall length of the bottle 310 is between 4 and 6 inches, and the outer diameter is between two and three inches. The neck 314 is preferably formed such that the opening 315 is one inch or more in diameter. The flange 316 has a spherical inner surface 317 which is formed as a socket to receive the hollow member 320. The flange 316 is preferably formed to extend a distance of between one-half and three-quarters of an inch above the neck 314.

The hollow member 320 is formed as a hollow spherical body having a curved wall 321 defining a lower (second) opening 325 and a neck 326 upon which are formed threads 327 and which defines an upper opening 328. In an embodiment for producing eight ounces of hydrated mixture, the curved wall 321 is preferably between two and three inches in outer diameter; the selected size being matched with the curved flange 316 of the bottle 310 such that the hollow member 320 is rotatable or pivotable on the curved inner surface 317. Both the upper opening 328 and the lower opening 325 communicate with an interior 329 of the hollow member 320. The upper opening 328 is preferably one to one and one-half inches in diameter to facilitate entry of a substance into the hollow member 320. The lower opening 325 is preferably one inch or more to facilitate thorough mixing of the substance with the liquid stored in the bottle 310.

The housing 330 includes a body 331 having a lower portion 332 and an upper portion 333. The lower portion is cylindrical and has an inner diameter sized to fit over the threads 313 formed on the bottle 310. Threads 334 are formed on an inside surface 335 of the body 331 near an open end of the lower portion 332. An upper opening 336 is formed at the upper portion 333 and is sized such that the neck 326 of the hollow member 320 can pass through the upper opening 336 when the apparatus is assembled. Further, a shoulder 337 is formed on the upper portion 333 which prevents the hollow member 320 from passing through the upper opening 336. A slot 338 is formed in the shoulder 337 in which the neck 326 is disposed when the hollow member 320 rotates between the open position and the closed position, as described below.

The above-described second embodiment of the substance containment apparatus operates as follows.

The liquid and the substance are stored in the apparatus using the following steps. First, a predetermined amount of liquid is stored in the bottle 310 and the hollow member 320 is placed on the flange 316 connected to the bottle, as described above. The housing 330 is then placed over the hollow member 320 such that the neck 326 extends through the upper opening 336. The threads 334 on the housing 330 are then engaged with the threads 313 disposed on the bottle 310. The hollow member 320 is then rotated in the housing 330 such that the neck 326 slides in the slot 338 until the hollow member 320 is in a closed position, as shown in FIG. 8. The housing 330 is then rotated relative to the bottle 310 such that housing 330 is tightened to the bottle 310. As the housing 330 is tightened on the bottle 310, the shoulder 337 pushes against the curved wall 321, thereby biasing the hollow member 320 against the inner surface 317 of the flange 316. In the closed position shown in FIG. 8, a portion of the curved wall 321 is disposed to block the opening 315 of the bottle 310 such that the liquid is sealed in the bottle 310. A predetermined amount of a substance, such as powdered baby formula, is then entered into the interior 329 of the hollow member 320 through the upper opening 328. A cover, such as nipple assembly 305, is then secured over upper opening 328, thereby sealing the substance inside the hollow member 320. The apparatus is then stored until the desired mixing time.

At the desired time, mixing of the liquid stored in the bottle 310 and the substance stored in the hollow member 320 is effected as follows. First, the housing 330 loosened on the bottle 310 such that the hollow member 320 becomes rotatable within the housing 330. Note that the housing is not removed from the bottle 310 during the loosening step, thereby preventing exposure of the substance and the liquid to the surrounding environment. With the housing 330 in the loosened position, the hollow member 320 is rotated in the housing 330 such that the neck 326 slides in the slot 338 until the hollow member 320 is in an open (upright) position, as shown in FIG. 8. In the open position, the lower opening 325 of the hollow member 320 is aligned with the opening 315 of the bottle 310, thereby forming a passage between the interior of the bottle 310 and the interior 329 of the hollow member 320. The housing 330 is the retightened to the bottle 310 such that the flange 316 and the curved wall 321 surrounding the lower opening 325 to form a seal around the passage formed by the opening 315 and the lower opening 325. The apparatus is then manually shaken until the substance and the liquid are thoroughly mixed. The apparatus is then inclined such that the mixture flows through the third opening 326. A nipple assembly (not shown) can be used to regulate the flow of the mixture through the third opening 326.

The plastic used to produce the hollow member 320 and the flange 316 must be strong enough to withstand the biasing pressure when the apparatus is in the open or closed position. In addition, the preferred plastic is elastically deformable to produce a liquid-resistant seal around the first opening 315, thereby preventing leakage when the hollow member 320 is biased against the flange 316. Further, the preferred plastic is Food and Drug Administration approved for food storage, exhibits sufficient lubricity for smooth sliding without the need for lubricants, and is not structurally or chemically altered when subjected to cleaning temperatures of up to 100° C. Several plastic materials are currently available which can be modified using known methods to meet the preferred characteristics discussed above, such as polyethylene, polypropylene, and polycarbonate.

The substance containment apparatus embodying the present invention overcomes the disadvantages of the prior art by providing a sanitary method for separately storing two substances, such as water and powdered baby formula, which have a short shelf-life once mixed, until a desired mixing time. In addition, the present substance containment apparatus overcomes the disadvantages of the prior art two-chamber apparatus in that a large, unobstructed flow area is provided, thereby allowing complete mixing of the two substances.

Although the present invention has been described in considerable detail with reference to certain embodiments thereof, other containers embodying the present invention are possible. For example, the ball member 221 of the first embodiment can be truncated to include only the blocking portion 222. In addition, applications of the apparatus and method incorporating the present invention are not limited to edible substances; the apparatus can be used for storing numerous reactive substances whose mixture is beneficially contained within a single container. Further, the apparatus can be made from metal, ceramic or any other material, so long as seals, such as rubber O-rings, are provided to prevent leakage. Therefore, the spirit and scope of the appended claims should not be limited to the description of the embodiments contained therein.

We claim:

1. A containment apparatus comprising:

a bottle for storing a first substance, the bottle defining a first opening, and a hollow member for storing a second substance, the hollow member including a curved wall and having a second opening and a selectively sealable third opening, wherein the curved wall of the hollow member is moveable between a first position in which a portion of the curved wall is disposed to block the first opening such that the first stored substance is separated from the second stored substance, and a second position in which the first opening aligns with the second opening to form a passage between the interior of the bottle and the interior of the hollow member such that said first substance forms a mixture with said second substance, and wherein the second substance is insertable through the third selectively sealable opening into the hollow member when the curved wall of the hollow member is in the first position.

2. An apparatus of claim 1 wherein the hollow member comprises a housing defining a fourth opening, and the curved wall comprises a ball member rotatably disposed in the housing, and wherein the housing is connected to the bottle such that the first opening is aligned with the fourth opening.

3. An apparatus of claim 2 wherein the housing further comprises a lower casing connected to the bottle, an upper casing disposed on the lower casing, and means for connecting the lower casing to the upper casing.

4. An apparatus of claim 3 wherein the ball member includes and outer spherical surface and a cam follower formed on the outer surface, and wherein one of the lower casing and the upper casing includes an inner spherical surface defining a cam groove into which is disposed the cam follower, the cam groove being formed such that when the hollow member is in the first position, the cam follower is disposed in a first location in the cam groove, and when the hollow member is in the second position, the cam follower is disposed in a second location in the cam groove.

5. An apparatus of claim 4 wherein the upper casing is movable relative to the lower casing when the connecting means is in a loosened position, and movement of the upper casing relative to the lower casing causes the cam follower to slide in the cam groove, thereby causing rotation of the ball member.

6. An apparatus of claim 5 wherein the ball member includes a fifth opening and the upper casing includes the third opening, and wherein when the hollow member is in the second position, the third and fifth openings align to form a second passage into the interior of the hollow member.

7. An apparatus of claim 6 wherein the upper casing includes a neck surrounding the fifth opening, and the apparatus further comprises a nipple assembly removably connected to the neck.

8. An apparatus of claim 1 further comprising a housing adjustably connected to the bottle, the housing defining an interior portion, wherein the hollow member is rotatably disposed in the interior portion when the housing is loosely connected the bottle, and wherein the hollow member is fixedly disposed in the interior portion when the housing is tightly connected to the bottle.

9. An apparatus of claim 8 wherein the bottle includes a flange surrounding the first opening for receiving the hollow member.

10. An apparatus of claim 9 wherein the hollow member is integrally formed with the curved wall, at least a portion of an outer surface of the curved wall is spherical, and the flange includes a spherical surface formed to receive the hollow member such that when the housing is tightly connected to the bottle and the hollow member is in the first position, the hollow member is biased against the flange to seal the first opening of the bottle.

11. An apparatus of claim 9 wherein the curved wall defines the second opening, at least a portion of an outer surface of the curved wall is spherical, and the flange includes a spherical surface formed to receive the hollow member such that when the housing is tightly connected to the bottle and the hollow member is in the second position, the hollow member is biased toward the flange to form a seal around the passage formed by the first opening and the second opening.

12. An apparatus of claim 8 wherein the housing includes a slot, wherein the hollow member includes a neck protruding through the slot.

13. An apparatus of claim 12 further comprising a nipple assembly removably connected to the neck.

14. A substance containment apparatus comprising:

a bottle including a neck forming a first opening into an interior of the bottle, and a flange integrally molded around an end of the neck;

a hollow member supported on the flange over the first opening, the hollow member including a wall defining a second opening and a third opening; and means for adjustably securing the hollow member to the bottle;

wherein the hollow member is slidable relative to the flange between a first position, in which a portion of the wall is disposed to block the first opening, and a second position in which the first and second openings align to define a passage between an interior of the bottle and an interior of the hollow member; and wherein the entire hollow member is located outside of the interior of the bottle in both the first position and the second position.

15. The substance containment apparatus of claim 14, wherein the hollow member comprises:

a spherical wall defining the second and third openings; and a neck integrally molded with the spherical wall and protruding from the spherical wall through an opening formed in the securing means, wherein the neck surrounds the third opening.

16. The substance containment apparatus of claim 15, further comprising a cap and nipple assembly connected to the neck of the hollow member.

17. A substance containment apparatus comprising:

a bottle having an interior and including a first opening into the interior;

a hollow member supported over the first opening, the hollow member including a wall defining second and a third openings, the hollow member also including a neck integrally molded on the wall around the third opening and extending from the wall; and means for adjustably connecting the hollow member to the bottle such that the hollow member is slidably mounted over the first opening, the connecting means defining an upper opening;

wherein the hollow member is rotatable relative to the bottle between a first position, in which a portion of the wall is disposed to block the first opening, and a second position in which the first and second openings align to define a passage between an interior of the bottle and an interior of the hollow member;

wherein the neck of the hollow member protrudes through the upper opening of the connecting means; and wherein the entire hollow member is located outside of the interior of the bottle in both the first position and the second position.

18. The substance containment apparatus of claim 17, wherein the bottle further comprises a neck and a curved flange integrally molded on the neck, the curved flange surrounding the first opening, and wherein the hollow member is supported on the curved flange.

19. The substance containment apparatus of claim 17, further comprising a cap and nipple assembly connected to the neck of the hollow member.

20. A containment apparatus comprising:

a bottle for storing a first substance, the bottle defining a first opening and a second selectively sealable opening, and a hollow member for storing a second substance, the hollow member including a curved wall and having a third opening, wherein the curved wall of the hollow member is moveable between a first position in which a portion of the curved wall is disposed to block the first opening such that the first stored substance is separated from the second stored substance, and a second position in which the first opening aligns with the third opening to form a passage between an interior of the bottle and an interior of the hollow member such that said first substance forms a mixture with said second substance, and wherein the first substance is insertable through the second selectively sealable opening into the bottle when the curved wall of the hollow member is in the first position.

21. A method of containing a first substance and a second substance for mixing at a predetermined time, the method comprising the steps of:

disposing a first predetermined amount of the first substance in a bottle having a first opening;

rotating a curved wall to block the first opening;

storing a second predetermined amount of the second substance in a hollow member having a second opening;

at the predetermined time, rotating the curved wall away from the opening such that a passage is created between the first substance and the second substance thereby allowing the first and second substances to mix within at least one of the bottle and the hollow member; and dispensing the mixed first and second substances through a third opening formed in one of the bottle and the hollow member.

* * * * *